Oct. 14, 1941.   F. H. HIBBARD   2,259,309
CHRONOMETRIC INSTRUMENT
Filed Dec. 4, 1937   4 Sheets-Sheet 1
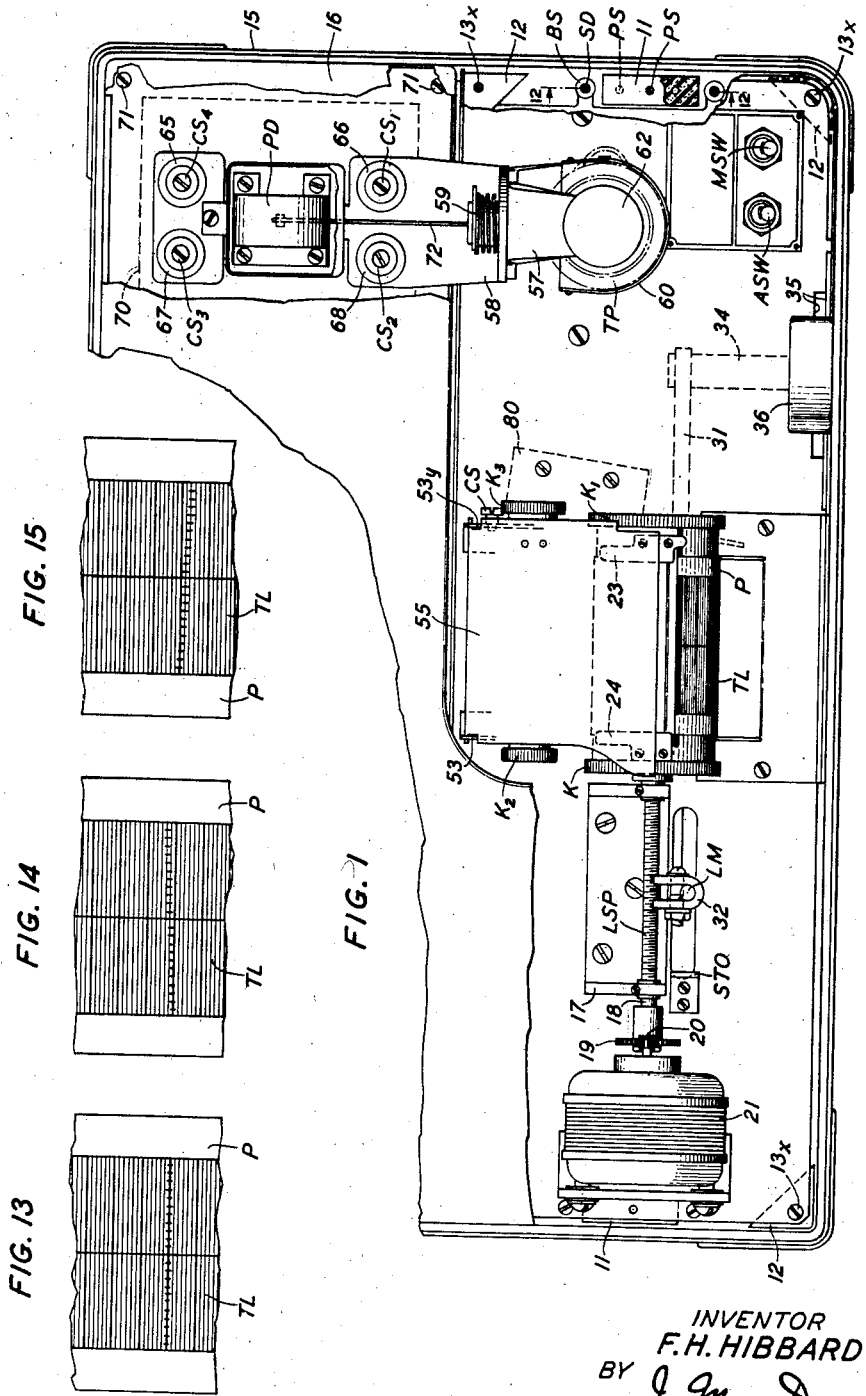
INVENTOR
F. H. HIBBARD
BY J. MacDonald
ATTORNEY Oct. 14, 1941.  F. H. HIBBARD  2,259,309
CHRONOMETRIC INSTRUMENT
Filed Dec. 4, 1937  4 Sheets-Sheet 2
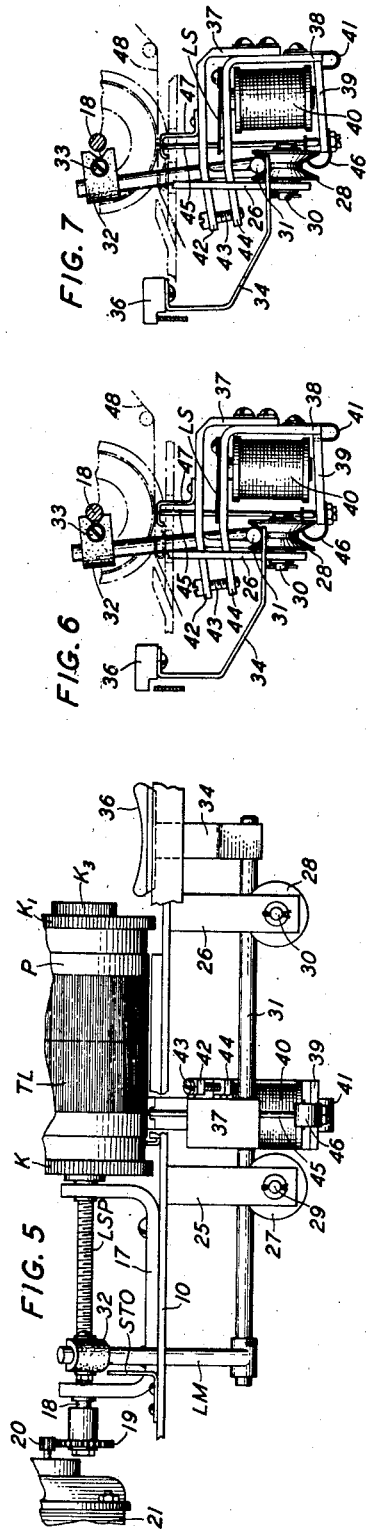
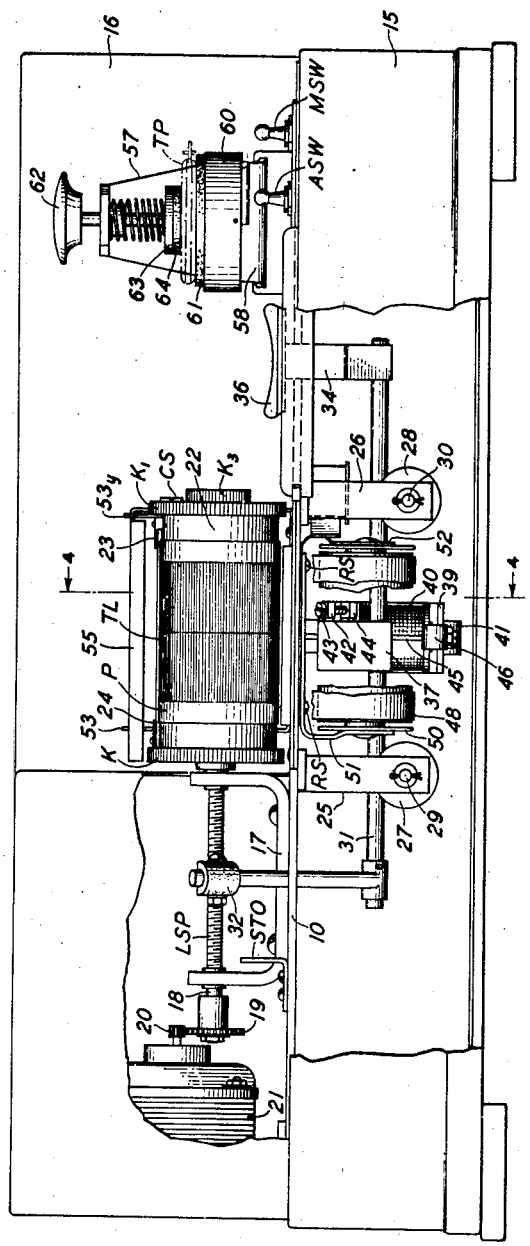
INVENTOR
F. H. HIBBARD
BY J. MacDonald
ATTORNEY Oct. 14, 1941.                F. H. HIBBARD                2,259,309
                        CHRONOMETRIC INSTRUMENT
                        Filed Dec. 4, 1937            4 Sheets-Sheet 3

INVENTOR
F. H. HIBBARD
BY J. MacDonald
ATTORNEY

Oct. 14, 1941.  F. H. HIBBARD  2,259,309
CHRONOMETRIC INSTRUMENT
Filed Dec. 4, 1937  4 Sheets-Sheet 4
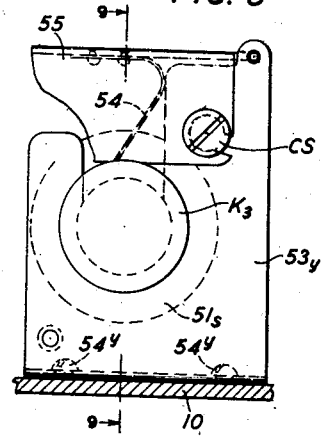
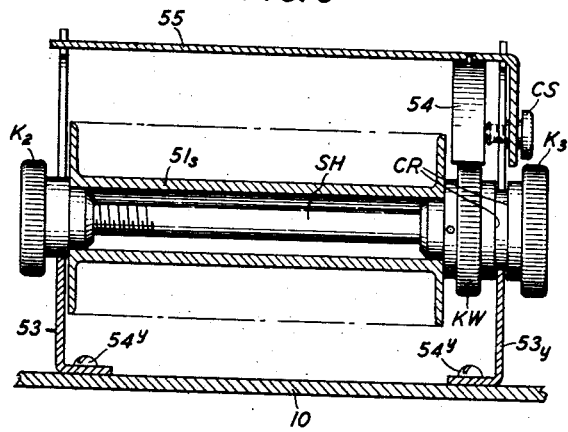
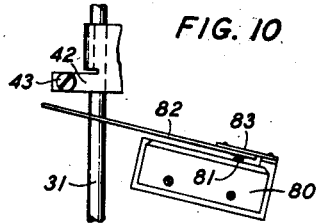
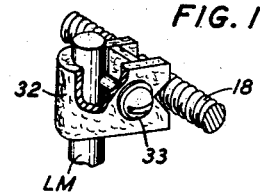
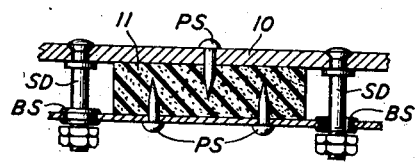
INVENTOR
F. H. HIBBARD
BY J. MacDonald
ATTORNEY Patented Oct. 14, 1941

2,259,309

UNITED STATES PATENT OFFICE 2,259,309

CHRONOMETRIC INSTRUMENT

Frank H. Hibbard, Mountain Lakes, N. J., assignor to Bell Telephone Laboratories, Incorporated, New York, N. Y., a corporation of New York Application December 4, 1937, Serial No. 178,177

2 Claims. (Cl. 234—36.5)

This invention relates to testing devices and more particularly to a device for measuring and recording the operation of watches, clocks and like time mechanisms.

The object of the invention is to provide a testing device of the type above referred to which will be simple, convenient in use and which will give an accurate indication of the operation of a time mechanism under test in a minimum of time.

According to this invention, the operation of a time mechanism is measured and recorded on a paper strip in the form of successive marks representing the vibrations produced by the time mechanism under test. Actuating means is provided for rotating the paper strip at a speed per unit of time corresponding to the occurrence of successive vibrations in a standard time mechanism. The paper strip is provided with time lines disposed across its length and in the direction of movement of an electro-magnetically operated recording means in its movement as imparted by a standard, such recording means in turn operating a stylus or marker according to the vibrations produced by the time mechanism under test for printing such time marks on the paper strip, the deviations of time marks as read with reference to the direction of the time lines on the paper strip being an indication of the inaccuracies in the operation of the timepiece under test. The mechanical vibration of the timepiece under test are translated into electrical impulses which are transmitted to the electromagnetic device through a suitable amplifier circuit.

Other novel features of the invention and other advantages will appear from the following description and by the claims appended thereto, reference being had to the accompanying drawings, in which:

Fig. 1 is a top assembly view showing the casing with portions cut away;

Fig. 2 is a front view showing the casing and a number of operating parts with portions cut away;

Fig. 5 is a view of the marker driving mechanism;

Fig. 6 is an end view of Fig. 5 shown with the marker-driving mechanism in the engaged position;

Fig. 7 is a view similar to that of Fig. 6 showing the marker-driving mechanism in the disengaged position;

Fig. 8 is an end view showing one of the supports for the spool of the carbon ribbon;

Fig. 9 is a longitudinal cross-sectional view of the carbon ribbon spool taken on line 9—9 of Fig. 8 showing the supports in section;

Fig. 10 is a detailed view of the motor switch operating mechanism;

Fig. 11 is a partial view of the lead screw and the nut used for moving the marker across the paper chart;

Fig. 12 is an enlarged view of a portion of the mechanism supporting plate and a portion of the casing shown in section with a rubber pad shown anchored therebetween; and Figs. 13, 14 and 15 are examples of records made according to the operation of the recorder of the invention.

Figure 3:
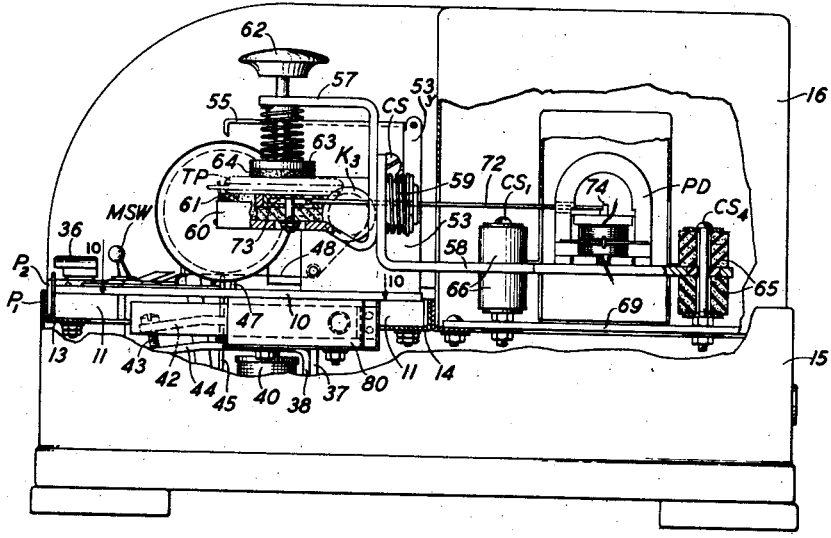
Fig. 3 is a right-hand view showing the casing with portions cut away and a number of operating parts in section.

In the drawings 10 is a plate which is mounted on a plurality of rubber pads 11 and 12, in turn resting on two inwardly and parallelly disposed peripheral rims 13 and 14 formed with the casing or base portion 15, the rubber pads 11 being held in place by a number of pins PS shown in Figs. 1 and 12 while the pads 12 are held by screws 13 as shown in Fig. 1.

Figure 4:
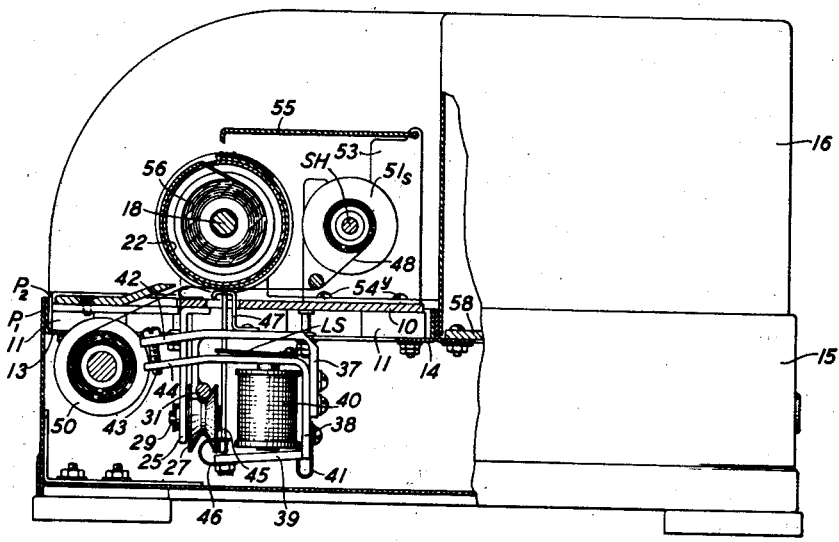
Fig. 4 is a cross-sectional view taken on line 4—4 of Fig. 2.

The base portion 15 and the top portion 16 are provided with peripherally disposed interfitting portions $P_1$ and $P_2$ as shown in Figs. 3 and 4 to form when in assembled relation a housing for the recorder-operating mechanism which will be hereinafter described in detail.

The plate 10 rests on the pad 11 but is limited in an upward movement thereon by bolts SD passing through rubber bushings BS and on this plate is mounted a U-shaped bracket 17 shown in Figs. 1, 2, 3 and 4, provided for supporting a rotatable shaft 18 having a lead screw portion LSP. On one end of this shaft is securely mounted a drum 22 having knurled peripheral ridges K and $K_1$ for manually rotating it and on the opposite end of shaft 18 is secured a gear 19 disposed in engaging relation with a pinion 20 securely mounted on one end of the armature shaft of a constant speed motor 21, the speed ratio of gear 19 and pinion 20, considering the speed of motor 21, being such as to rotate the drum 22 at a speed of five revolutions per second or one turn for each beat of a standard time mechanism.

The drum 22 is provided with spring clips 23 and 24 for securing one end of a paper strip P on which the operation of the timepiece is recorded. This paper strip is wound on a spool 56 in turn mounted on the shaft 18 concentric to the drum 22, and is printed with groups of time lines TL as shown in Figs. 1, 2, 5, 13, 14 and 15, each line representing five seconds time and each group of lines thirty seconds.

To the underside of plate 10 and downwardly extending therefrom are secured the brackets 25 and 26 shown in Figs. 2, 4 and 5, each provided with studs 29 and 30 laterally extending therefrom for loosely mounting the V-shaped, grooved pulleys 27 and 28 provided for supporting a rod 31. On one end of this rod is secured a lever member LM, which extends upwardly therefrom for receiving at its free end a comb or nut 32 shown in Figs. 1, 2, 5, 6, 7 and 11 in the form of a U-shaped leather strip which is securely held at the free end of lever member LM by a bolt 33, the ends of the leather strip being formed with V-shaped grooves for engaging the lead screw portion LSP of shaft 18, as shown in Figs. 6 and 11.

On the other end of rod 31 is secured, as by welding, a lever member 34, shown in Figs. 1, 2, 5, 6 and 7, having its upright extending end projecting through a slot 35 in the plate 10 for mounting a handle 36 provided for imparting a small angular movement to the rod 31 for moving the nut 32 out of engaged relation from the lead screw portion LSP of shaft 18 and manually imparting a longitudinal movement to this rod on the rollers 27 and 28 for moving the nut 32 in starting position on the lead screw as shown in Fig. 5 at the beginning of each recording operation, such starting position being defined by a stop member STO shown in Figs. 1, 2 and 5, and on the rod 31 at a point between the brackets 25 and 26 is secured, as by welding, one end of an inverted U-shaped bracket 37 which is provided for mounting the heel-piece 38 of a magnet 40, an armature 39 being mounted on the heel-piece 38 on a so-called knife edge pivot where it is retained in adjusted position thereon by a spring 41.

The U-shaped bracket 37 is formed with a projecting lug 42 as shown in Figs. 2, 3, 4, 6 and 7, extending in parallel relation with a lug portion 44 formed with the heel-piece 38 of magnet 40 and a screw 43 which engages a clearance hole in lug 42 of bracket 37 and a threaded hole in the lug 44 of heel-piece 38 is provided for adjusting a marker in the form of a pointed rod 45 relative to the turning axis of drum 22, this marker being carried by the armature 39 and retained in operative relation thereon by a spring 46 while a leaf spring member LS which has one of its ends secured to the heel-piece 38 is provided for holding the marker 45 at this end and to serve as retractile spring for the marker and its actuating armature 39, the weight of magnet 40 and its associated operating parts tending to rotate the rod 31 on the pulleys 27 and 28 for normally holding the nut 32 in engaged relation with lead screw portion LSP of shaft 18.

A carbon ribbon 48, shown in Figs. 3 and 4, is interposed between the paper strip P carried by the drum 22 and the effective end of marker 45, it being supported for a small distance on each side of marker 45 by an angle-shaped piece 47 secured to the bracket 37. One end of the carbon ribbon is coiled on a spool 50 journaled on the spring arms 51 and 52 shown in Fig. 2 secured to the underside of the plate 10, as by rivets RS, the other end of the carbon ribbon being coiled on a spool 51a shown in Figs. 3, 4, 8 and 9 having its support shaft SH journaled on upright flanges 53 and 53y, shown in Figs. 1, 2, 3, 4, 8 and 9, which are secured to the mounting plate 10 by a number of screws 54y while the supporting shaft of spool 51a is provided with knurled knobs K2 and K3 for manually rotating this spool as to present a fresh portion of the carbon ribbon 48 in juxtaposition to marker 45 after a certain number of recording operations.

The carbon ribbon 48 is frictionally held from unwinding on the spool 51a by a spring 54 carried by a plate 55 in turn pivoted on the uprights 53 and 53y with the free ends of spring 54 resting on a knurled wheel KW keyed on shaft SH, the longitudinal movement of shaft SH being prevented by the support 53y engaging a collar CR formed in the hub of knurled knob K3.

Plate 55 extends tangentially to the drum 22, where it may be held against the tension of spring 54 by a screw CS shown in Figs. 1, 2, 3, 8 and 9 engaging the support 53y. The front edge of plate 55 is bent downwardly to serve as a knife edge against which that portion of the paper strip with the printed record thereon is detached from its spool 56 in the drum 22, while the loosening of screw CS permits the pivotal movement of plate 55 into a substantially vertical position for the removal or insertion of spool 51a and its supporting shaft SH on supports 53 and 53y.

The support for the timepiece consists of a bracket 57, shown in Figs. 1, 2 and 3, pivotally mounted on the upright extending lug portion of an angle-shaped supporting plate 58. This bracket is frictionally held in adjusted angular position on the lug portion of plate 58 by a coiled spring 59 and the lower disposed arm of bracket 57 is provided with a semi-circular rim 60 for receiving a pad 61 of felt or other soft material for receiving the timepiece TP as shown in Figs. 2 and 3, the timepiece being securely held thereon by a spring pressed plunger 62 having at its lower end a disc portion 63 to which is secured a similarly shaped pad 64 of soft material engaging the crystal of the timepiece.

The plate 58, as shown in Figs. 1 and 3, is clamped between four sets of rubber bushings 65, 66, 67 and 68, and each set is secured to a supporting plate 69 by screws CS1, CS2, CS3 and CS4. This plate rests on a peripheral rim 70 formed with the casing portion 15 and is secured thereon by a number of screws 71.

On plate 58 is mounted an electromagnetic pick-up device PD provided for translating the mechanical vibrations of the timepiece TP into electrical impulses which are received by magnet 40 through an amplifier circuit (not shown) for imparting longitudinal movements to marker 45 at a frequency corresponding to the beats of the timepiece TP under test. The vibrations of the timepiece are imparted to the electromagnetic pick-up or translating device PD by a rod 72 shown in Figs. 1 and 3 having at one of its ends a disc portion 73 in contact with the watch case of the timepiece and its opposite end threadedly engages the armature 74 of the magnetic pick-up device.

A switch 80 shown in Figs. 1, 3 and 10 is secured to the under side of plate 10. This switch is provided with a plunger member 81 actuated by an arm 82 having one of its ends secured to a leaf spring member 83 with its free end extending in operable relation with lug 42 of the inverted U-shaped bracket 37, this switch being provided for opening the motor circuit when the marker 45 has traversed the record sheet, i. e., at the conclusion of each recording operation.

In a typical example of operation, the watch to be tested is placed on the felt pad 61 with the center portion of the watch case in contact with the disc 73 at the end of rod 72 where it is held by the spring-pressed plunger 62, as shown in Figs. 1, 2 and 3. With the record strip clamped on the drum 22, as shown in Fig. 4, and the nut 33, together with the marker 45, in the starting position against the stop STO, shown in Figs. 2 and 5 by the operation of handle 36, the switches ASW and MSW are operated for energizing the amplifier and motor circuits, respectively. The operation of motor 21 is effective to rotate the shaft 18 and thereby the drum 22 simultaneously with the longitudinal movement of rod 31 and that of the marker 45 across the paper strip P, as imparted by the lead screw portion LSP of shaft 18. As above stated, the speed ratio of the gears 19 and 20, considering the revolutions per minute of motor 21, is such as to rotate the drum 22 at a speed of five revolutions per second or one turn for each beat of a standard timepiece while a pitch for the lead screw portion of shaft 18 is so chosen as to move the marker 45 across the paper record in a lapse of time of thirty seconds, when the switch 80 is moved to its open position through the movement of its operating arm 82 for stopping the constant speed motor 21.

That portion of the paper on which the record is printed may be detached from the spool 56 by bringing it in contact with the knife edge portion of plate 55 and a new length of the strip secured on the drum by the clips 23 and 24, as above described.

As shown by the example of the record in Fig. 13, if the timepiece under test is correct, the record of its operation will appear as a series of dots disposed on or in line parallel to one of the time lines on the paper chart. In Fig. 14 the line of dots deviates a distance of two lines from its starting point, with respect to its adjacent time lines, indicating that the timepiece under test is ten seconds "fast" per day, while in Fig. 15 the line of dots is shown deviated a distance of two lines in the opposite direction to that of Fig. 14, indicating that the operation of the timepiece tested is ten seconds "slow" per day.

In the device of the invention the pivoted bracket or support 57 for the timepiece permits the recording of the timepiece under test in a number of angular positions as to simulate the carrying of the timepiece by a person, thus permitting an accurate adjustment of a timepiece in a minimum of time and adjusting operations.

What is claimed is:

1. In a chronometric instrument having means for moving a record sheet, a marking device and means for moving the marking device transversely of the direction of movement of the record sheet, said marking device comprising a stylus and electromagnetic means for bringing said stylus into engagement with the record sheet, the improvement which comprises a bracket secured to said moving means and a bracket securely mounted on said first bracket and having a part supporting the electromagnetic means and another part for guiding the stylus, said first bracket having a flexible portion, and mutually adjustable means engaging said brackets for flexing the first bracket and thereby moving the second bracket to adjust said stylus relative to said record sheet.

2. In a chronometric instrument having a rotatable drum on which a record sheet is supported, a marking device, and means for moving the marking device parallel to the axis of rotation of the drum, said marking device comprising a stylus and electromagnetic means for bringing said stylus into engagement with the record sheet, the improvement which comprises a bracket secured to said moving means and a bracket securely mounted on the first-mentioned bracket and having a part supporting said electromagnetic means and another part for guiding the stylus, said first-mentioned bracket having a flexible portion, and manually adjustable means engaging both brackets for flexing the first bracket and thereby moving the second bracket to adjust said stylus in a direction perpendicular to the axis of the drum.

FRANK H. HIBBARD.